United States Patent
Uekusa et al.

(10) Patent No.: US 6,954,288 B2
(45) Date of Patent: Oct. 11, 2005

(54) IMAGE-PROCESSING METHOD, IMAGE-PROCESSING DEVICE, AND STORAGE MEDIUM

(75) Inventors: Akihiko Uekusa, Kanagawa (JP); Manabu Yamazoe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 795 days.

(21) Appl. No.: 09/742,122

(22) Filed: Dec. 22, 2000

(65) Prior Publication Data

US 2001/0013953 A1 Aug. 16, 2001

(30) Foreign Application Priority Data

Dec. 27, 1999 (JP) .............................................. 11/369474

(51) Int. Cl.[7] .............................. G06F 15/00; G06K 1/00
(52) U.S. Cl. ......................... 358/1.9; 358/2.1; 358/519; 358/518; 382/162; 382/170
(58) Field of Search ......................... 358/1.9, 2.1, 519, 358/518; 382/162, 170

(56) References Cited

U.S. PATENT DOCUMENTS

| | | | | |
|---|---|---|---|---|
| 5,828,816 A | * | 10/1998 | Kise et al. | 358/1.9 |
| 6,118,455 A | * | 9/2000 | Hidaka et al. | 345/589 |
| 6,266,152 B1 | * | 7/2001 | Nakajima | 358/1.9 |
| 6,549,654 B1 | * | 4/2003 | Kumada | 382/162 |
| 6,628,826 B1 | * | 9/2003 | Gilman et al. | 382/167 |
| 6,654,491 B1 | * | 11/2003 | Hidaka | 382/162 |
| 6,741,262 B1 | * | 5/2004 | Munson et al. | 345/594 |

* cited by examiner

*Primary Examiner*—Kimberly Williams
*Assistant Examiner*—Michael Burleson
(74) *Attorney, Agent, or Firm*—Fitzpatrick, Cella, Harper & Scinto

(57) ABSTRACT

An image-processing method for performing color matching using a source profile and an output profile, includes a step of correcting input image data, a step of calculating a feature quantity of an input image based on the corrected image data, a step of performing an image correction process on the input image data in accordance with a processing condition responsive to the feature quantity, and a step of performing a color matching process on the corrected input image data. The image-processing method is thus performed with the color matching process result taken into account.

9 Claims, 12 Drawing Sheets

FIG. 4

TABLE [ ]

| INDEX | GROUP ID | RENDERING FUNCTION INFO | SAMPLING INFO |
|-------|----------|-------------------------|---------------|
| 0 | | IMAGE INFO VALUE | HISTOGRAM INFO VALUE |
| 1 | | IMAGE INFO VALUE | HISTOGRAM INFO VALUE |
| 2 | | IMAGE INFO VALUE | HISTOGRAM INFO VALUE |
| 3 | | IMAGE INFO VALUE | HISTOGRAM INFO VALUE |
| ⋮ | ⋮ | ⋮ | ⋮ |
| m | n | IMAGE INFO VALUE | HISTOGRAM INFO VALUE |

FIG. 9

| TABLE [ ] | | | |
|---|---|---|---|
| INDEX | GROUP ID | IMAGE INFO | SAMPLING INFO |
| 0 | 0 | IMAGE INFO 0 | HISTOGRAM INFO 0 |
| 1 | 0 | IMAGE INFO 1 | HISTOGRAM INFO 0 |
| 2 | 1 | IMAGE INFO 2 | HISTOGRAM INFO 1 |
| 3 | 1 | IMAGE INFO 3 | HISTOGRAM INFO 1 |
| 4 | 1 | IMAGE INFO 4 | HISTOGRAM INFO 1 |

TABLE AT THE END OF THE FIRST PROCESS FLOW [ ]

IMAGE-PROCESSING METHOD, IMAGE-PROCESSING DEVICE, AND STORAGE MEDIUM

BACKGROUND OF THE INVENTION

1. Field of the Invention

The present invention relates to an image-processing method, and an image-processing device for performing image processing, and a storage medium for storing a software program of the image-processing method.

2. Description of the Related Art

To present an output image based on image data on a printer or a display unit, color processes, such as a color correction process, a color conversion process, and a binarizing process need to be performed according to the type of a plurality of objects forming the output image. In the printing or displaying of an image formed by computer application software, a device driver or a device images a group of rendering commands from the application software, thereby producing image data on an entire page, and then printing the image on the printer or displaying the image on the display unit.

The rendering command group constituting a document issues, to the device driver, an image rendering command for a photograph image portion, a text rendering command for a text portion, and a graphic rendering command for a graphics portion of the image. The device driver performs a color process appropriate for the object according to the type of each command, and converts the document into an image which can be output by an output device.

The color matching process is switched to a "saturation mode" for the graphics portion, to a "colorimetric agreement mode", for the text portion, or to a "perceptual color enhancement mode", for the photograph portion so that an optimum output is provided in each object on an entire page.

Depending on a system or application software, a "source profile" is designated for the object, and the device driver thus provides a high-quality output using the content of the designated source profile. When an input image from a scanner is pasted onto a document, a color profile describing device characteristics of the scanner is designated in an image rendering command of the image. When color calibration is performed on a display, a color profile, describing the characteristics of the monitor to be used to reproduce the color which an editor may has seen, may be designated. These color profiles may be an ICC (International Color Consortium) profile, for example, and Windows ICM manufactured by Microsoft and ColorSync manufactured by Apple Computer Inc. are known.

Even with such a fine color matching process system available, no high-quality output will be obtained if an original image itself is poor. For instance, when an image is picked up by a recently widely used digital camera with an insufficient exposure, a conventional system prints faithfully an insufficiently exposed picture on a printer as is. The result is not always successful. To improve the output image, a user has performed, on an entire original image, an image correction process, such as a non-linear color balance process, for compensating for the exposure of the original image using an image retouch software program, for example.

Without deep knowledge and experience, the user needs to perform a correction process on a trial and error basis, and the correction process is thus time-consuming.

When an image correction is performed on a photograph portion only of an original image in a DTP (Desk Top Publishing) document which is an existing document with an unprocessed photograph pasted, the photograph portion is cut from the original image. A retouch software program is used to perform an image correction process on the photograph portion. The retouched photograph portion is then pasted back on the original image. This series of steps is complex.

SUMMARY OF THE INVENTION

It is an object of the present invention to provide an image-processing method and an image-processing device for performing a proper image process.

It is another object of the present invention to provide a proper image-processing method and an image-processing device for performing a proper image process with the result of a color matching process taken into account.

An image-processing method for performing color matching using a source profile and an output profile includes a step of correcting input image data in accordance with the source profile, a step of calculating a feature quantity of an input image based on the corrected input image data, a step of performing an image correction process on the input image data in accordance with a processing condition responsive to the feature quantity, and a step of performing a color matching process on the corrected input image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows the structure of a table listing rendering commands;

FIG. 9 shows one example of a table at the end of the first process flow;

DESCRIPTION OF THE PREFERRED EMBODIMENTS

First Embodiment

Figure 1:
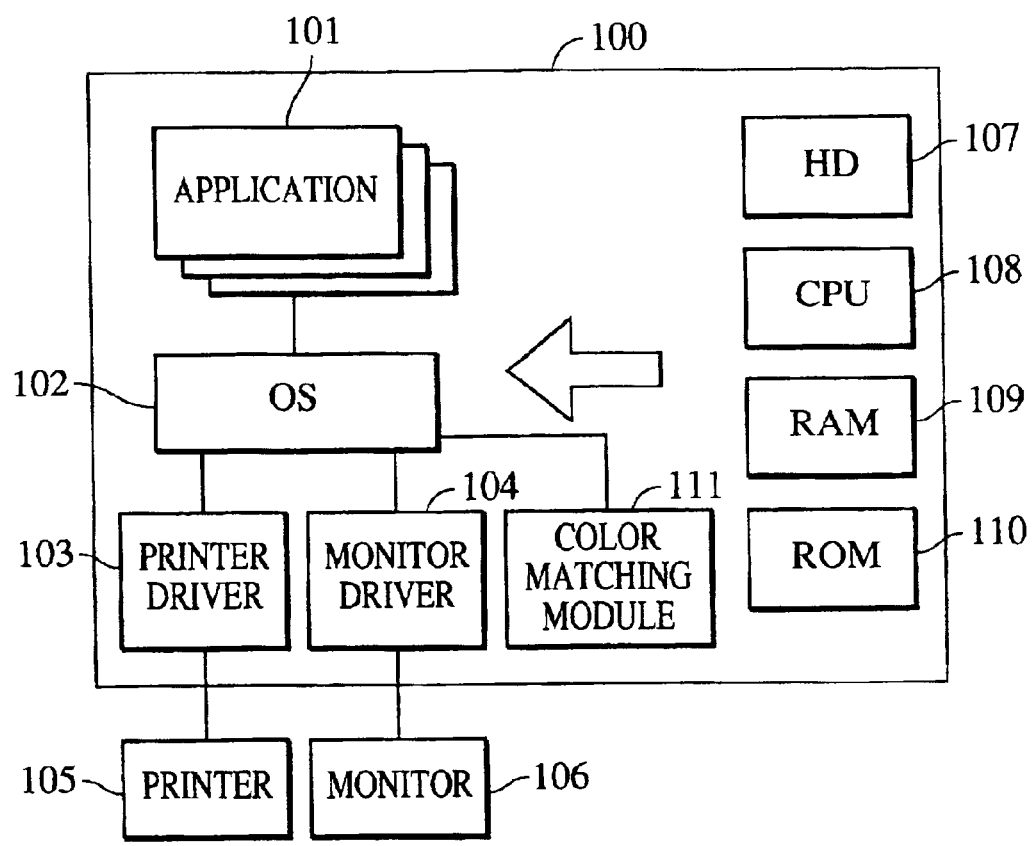
FIG. 1 is a block diagram showing one embodiment of the system of the present invention.

Referring to the drawings, a first embodiment of the present invention is now discussed in detail. FIG. 1 shows the system of the first embodiment of the present invention.

A printer 105 such as an ink-jet printer and a monitor 106 are connected to a host computer 100. The host computer 100 includes application software 101, such as word processing soft ware, spreadsheet software, and an Internet browser, and a printer driver 103 for creating print data by processing a variety of rendering commands (an image rendering command, a text rendering command, and a graphics rendering command). The rendering commands indicate an output image which is issued to an operating system (OS) 102 by the application software 101. The host computer 100 further includes a monitor driver 104 for displaying an image by processing a variety of rendering commands issued by the application software, and a color matching module 111 through which the driver performs a color matching process in response to a request of the application software 101.

The host computer 100 includes, as hardware components on which the software runs, a central processing unit (CPU) 108, a hard disk driver (HD) 107, a random access memory (RAM) 109, a read-only memory (ROM) 110, etc.

In the first embodiment shown in FIG. 1, Windows of Microsoft that runs on IBM AT compatible personal computers is employed as an OS, the application software 101 for performing a print job is installed, and the printer 105 and the monitor 106 are included in the system.

Based on a display image presented on the monitor 106, the host computer 100 creates, through the application software 101, image data such as text data classified as text such as characters, graphics data classified as graphics such as drawings, and image data classified as photographs. When the host computer 100 outputs image data to be printed, the application software 101 issues a print request, thereby issuing, to the OS 102, a rendering command group including a graphics rendering command for a graphics data portion and an image rendering command for an image data portion. The OS 102 receives the output request from the application software 101, and issues the rendering command group to the printer driver 103 corresponding to the printer 105.

The printer driver 103 processes the print request and the rendering command group from the OS 102, thereby creating print data printable on the printer 105, and transmitting the print data to the printer 105. When the printer 105 is a raster printer, the printer driver 103 successively rasterizes the rendering commands from the OS 102 in an RGB 24-bit page memory. When all rendering commands are rasterized, the content of the RGB 24-bit page memory is then converted into a print format printable on the printer 105, for example, CMYK data.

The print process of the printer driver 103 is now discussed.

The print operation of the printer driver 103 chiefly includes the following five processes.

(1) Recognition Process

The printer driver 103 determines the type of the rendering command of an object image input from the OS 102, thereby recognizing the object indicated by the rendering command as one of a photograph portion, a text portion or a graphics portion.

(2) Image Correction Process

An image correction process is performed to correct color balance, which would have been destroyed by photographing conditions.

Luminance histograms are created for a photograph to determine non-linear color balance correction conditions. The printer driver 103 performs non-linear color balance correction on the photograph, thereby correcting the color balance, contrast, and chroma of the photograph.

Figure 11:
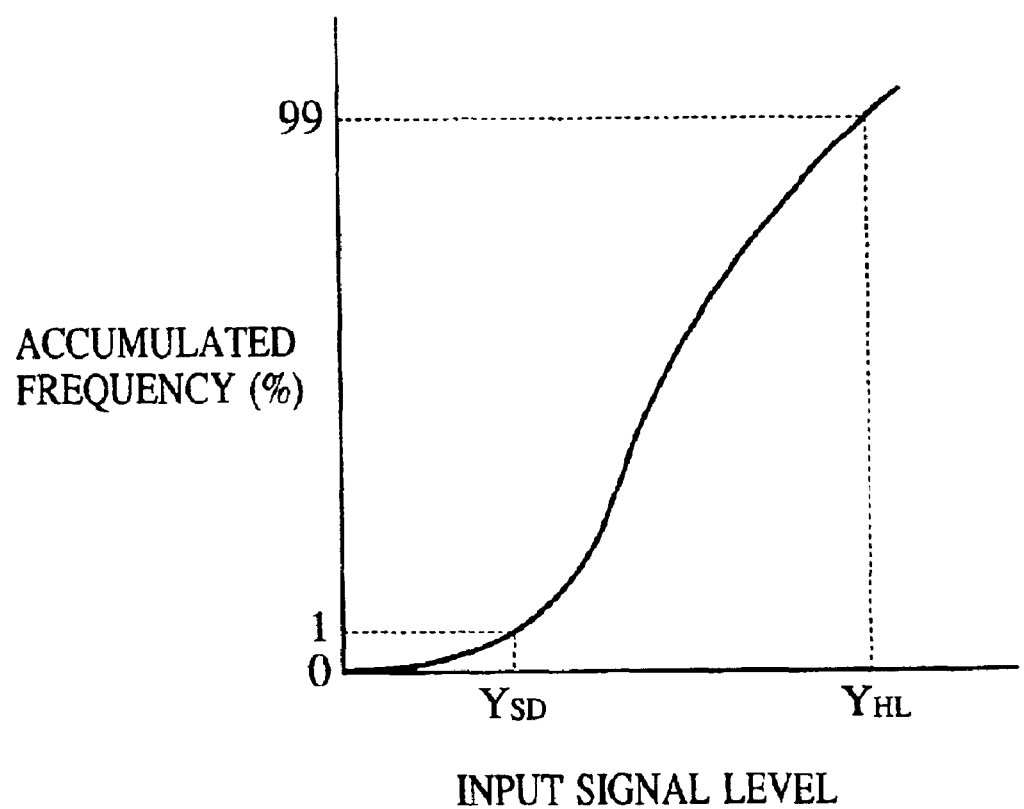
FIG. 11 shows the method of determining luminance of high light and shadow portions.
Figure 12A:
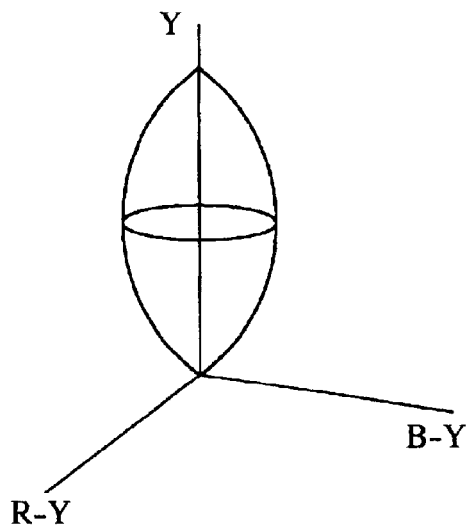
FIGS. 12A through 12C illustrate the principle of color balance correction.
Figure 12B:
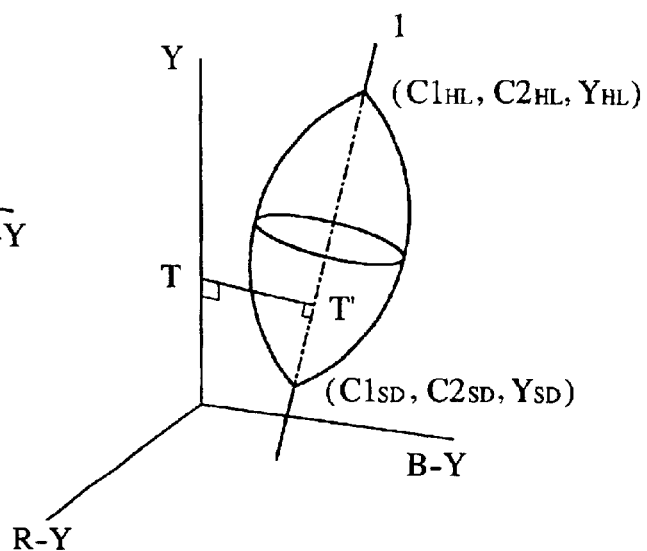
Figure 12C:
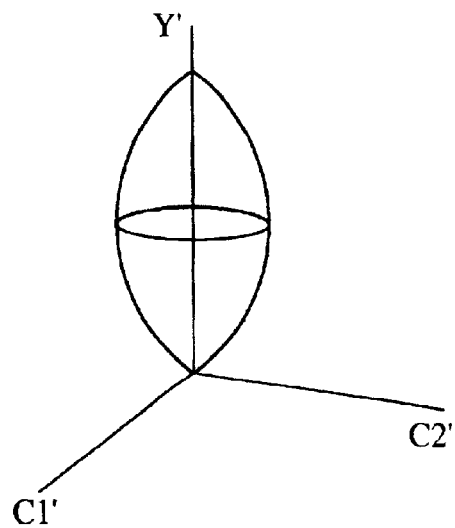
Figure 13:
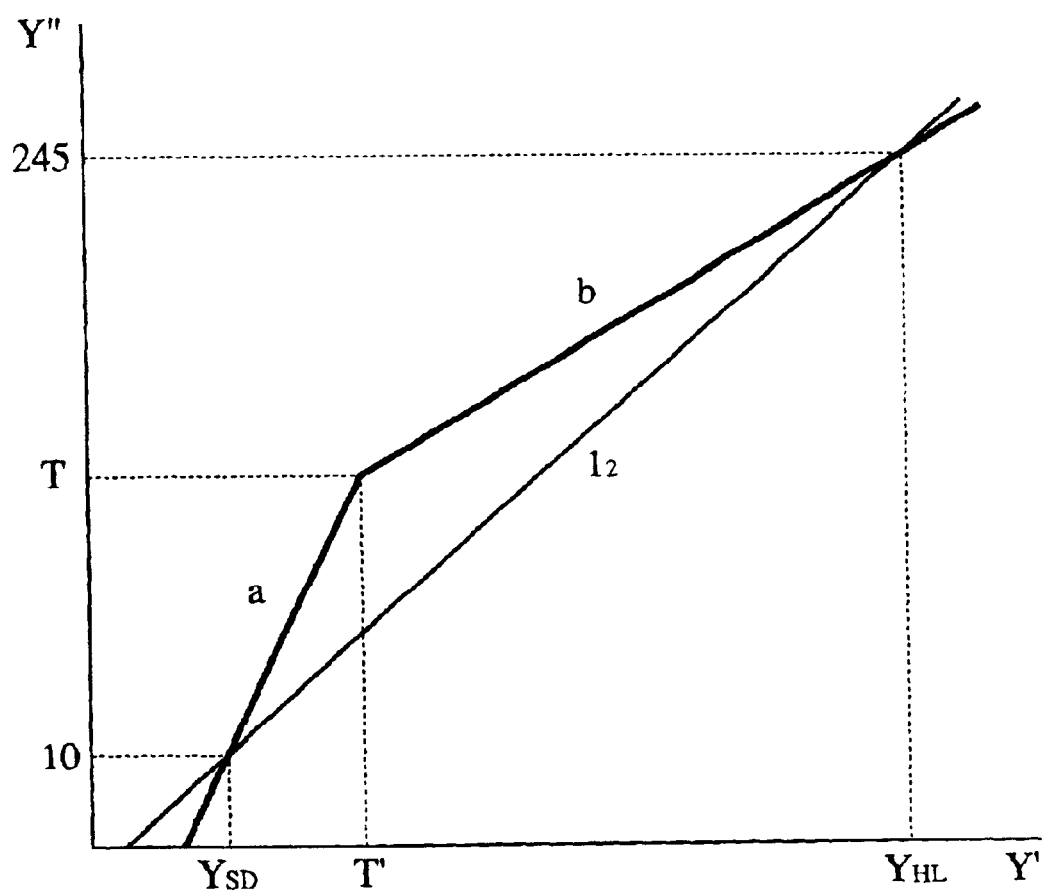
FIG. 13 illustrates contrast adjustment.

The image correction process is now discussed, referring to FIG. 11 through FIG. 13.

In the image correction processes of the first embodiment, a color balance correction process, a contrast correction process, and a chroma correction process are performed.

Color Balance Correction

A high-light point and a shadow point are set up within an image. A cumulative frequency histogram is created for a value signal that is obtained by weight-summing input RGB signals. An upper limit of the value signal corresponding to a predetermined cumulative frequency is set up as a high-light point and a lower limit of the value signal is set up as a shadow point.

When a source profile, which is used in a color matching process to be performed on the input image later, is available, the source profile may be used in the creation of the histogram and the determination of the high-light point.

To create the cumulative frequency histogram of the value signal, the RGB signal of the input image is corrected with a gamma value from source color space information of the source profile, and then weight-summed. By using, as a high-light point, a white point acquired from the source color space information, the effectiveness of the color matching process based on the source profile is accounted for. The image correction process is thus efficiently performed.

Color-difference signals (C1, C2) having the values of the high-light point and the shadow point of the image are stored. The color-difference signals C1 and C2 are as follows:

$$C1 = R - Y$$

$$C2 = B - Y$$

The averages are now referred to the color differences of the high-light point (C1(HL), C2(HL)), and the color differences of the shadow point (C1(SD), C2(SD)).

A color solid axis I (i.e., an achromatic color axis) of the input image is estimated from the color differences of the high-light point and the color differences of the shadow point as shown in FIG. 12B. An ideal color solid free from a color balance distortion is shown in FIG. 12A, i.e., the axis I thereof is aligned with the value axis Y.

The color balance correction process of the first embodiment determines a rotation matrix and a parallel translation amount required to convert the color solid axis I of the input object image (defined by the high-light point and the shadow point) into the value axis Y. The color balance of the input image is corrected by correcting the input object image with the rotation matrix and the parallel translation amount. The rotation matrix will be easily determined if the axis of rotation and the angle of the axis are determined.

Coordinates (C1, C2, Y) of each pixel of the input image shown in FIG. 12A in a three-dimensional color space are converted into coordinates (C1', C2', Y') as shown in FIG. 12C. In this way, the color balance of the image is corrected in the three-dimensional color space.

Adjustment of Contrast and Chroma

The adjustment of contrast and chroma is now discussed. The input image is checked for overexposure or underexposure in a simple manner, and the luminance signal of the image is thus subjected to a gamma correction in accordance with the exposure check result.

In the adjustment of contrast through gamma correction responsive to the exposure state of the image, luminance of the shadow point is set to be "zero" or in the vicinity of zero ("10", for example), and luminance of the high-light point is set to be "255" or in the vicinity of 255 ("245", for example).

Discussed next is the gamma correction which is performed in accordance with the simple exposure check of the image from the standpoint of overexposure and underexposure.

The nearest points T and T' of the color solid axis of the image and the luminance axis shown in FIG. 12B are now determined. These points will be easily determined from the geometrical relationship therebetween. Contrast is thus adjusted until the point T' comes to the point T. Specifically, now let (T, T') represent an inflection point as shown FIG. 13. The axis Y' is corrected to an axis Y" using a line a in a range of Y' below the point T', and the axis Y' is corrected to an axis Y" using a line b in a range of Y' above the point T'. When the axis of the image is in parallel with the luminance axis, the T itself does not make sense. In such a special case, correction is performed using a line l2.

The correction using the points T and T' is considered effective, particularly in an overexposed image or an underexposed image. Overexposure typically takes place in a clear sky with the image generally pulled up to light conditions. In input devices such as a digital camera, high-luminance suppression is performed and chroma in a high luminance region is reduced.

Figure 14A:
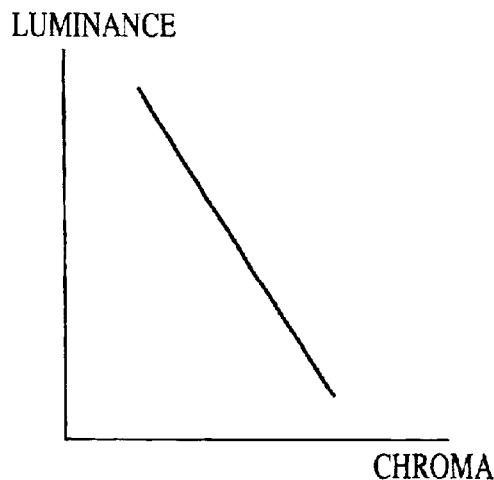
FIGS. 14A through 14D show plots of overexposure and underexposure in a luminance-chroma plane.
Figure 14B:
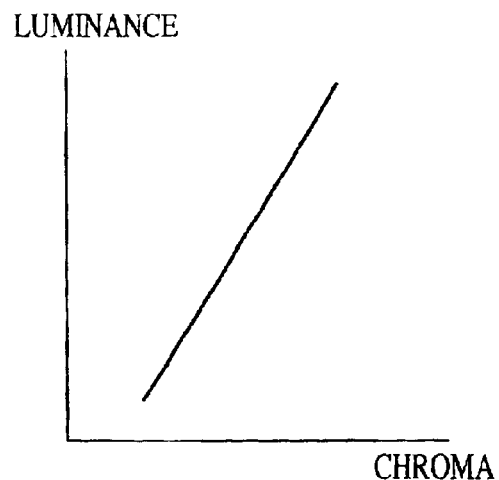

Referring to FIG. 14A, the color solid axis of the image is considered in a two-dimensional plane with chroma and luminance respectively aligned with the two axes. A region closet to the achromatic end appears. Conversely, low-luminance suppression is performed on an underexposed image as shown in FIG. 14B. The values of the points T and T' help easily determine whether the image has been overexposed or underexposed.

Figure 14C:
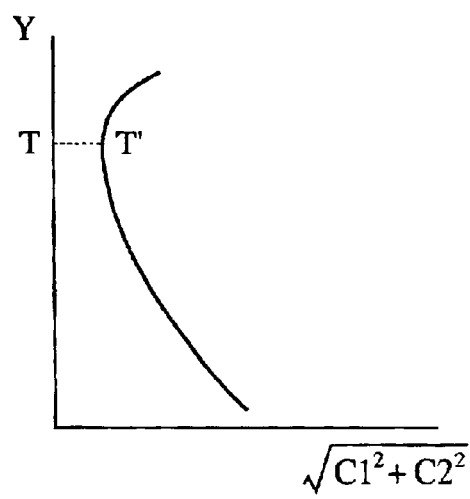
Figure 14D:
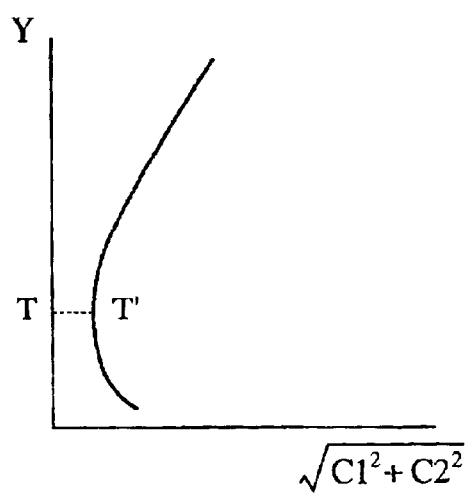

The color solid of an actual image is now considered in a luminance-chroma plane. An overexposed image results in a plot shown in FIG. 14C, while an underexposed image results in a plot shown in FIG. 14D.

The degree of displacement is considered to be the smallest at the position of T and T' on the assumption that an actual color solid is displaced from the ideal color solid thereof due to the effect of photographing conditions and in the process of analog-to-digital conversion. In the first embodiment, an appropriate gray level is attained in a simple way by putting the color solid back, in other words, brightness of the entire image is corrected.

The adjustment of chroma is quite easily performed. For example, to increase chroma by 20%, the following process may be performed.

$$C1'=1.2 \times C1'$$

$$C2'=1.2 \times C2'$$

This is because chroma is defined by the following equation.

$$Chroma = C1^2 + C2^2$$

The level of chroma adjustment may be determined in response to a user's instruction which is set in a user interface of the printer driver 103.

As described above, the image correction process in accordance with the first embodiment is performed in the luminance color-difference space.

Correction parameters used in the image correction process are a three-dimensional LUT (Lookup Table), which is formed of parameters 1 for converting the input RGB signal into the luminance color-difference signal, parameters 2 for performing color balance correction, contrast correction, and chroma correction in the luminance color-difference space, and parameters 3 for converting the luminance color-difference signal into an RGB signal. The parameters 2 include the rotation matrix already discussed in conjunction with the color balance correction, a table for converting luminance components, already discussed in conjunction with the contrast correction in FIG. 13, and coefficients for correcting the color-balance corrected, color-difference signal already discussed in conjunction with the chroma correction. The rotation matrix and the table for converting the luminance component are determined based on the histogram of the luminance component of the object image.

(3) Color Matching Process

The color matching module 111 performs a color matching process using the source profile responsive to input color information contained in the rendering command, and a printer profile corresponding to the printer 105. The input color information is thus converted into printer color information compatible with the printer 105.

When a profile is added to a header portion of the function of a rendering command, the added profile is used as the input profile. When no profile is added, the input profile may be a profile corresponding to the system monitor 106 set in the host computer 100 or may be a profile correspondingly set by the printer driver 103.

The color reproduction range of the printer 105 is usually narrower than the color reproduction range of the monitor 106. There are times when a color indicated by the input color information cannot be faithfully reproduced on the printer 105. The color matching process compatible with the type of the image indicated by the input color information is used to convert the input color information into printer color information having a color falling with the color reproduction range of the printer 105.

The color matching process supports three modes: a "perceptual color enhancement mode", a "saturation" mode, and a "colorimetric agreement" mode.

The perceptual color enhancement mode is appropriate for use in the photograph portion of the image, and hue and color gradation of the image are of primary concern. The entire image is mapped within the color reproduction range of the printer 105 in a manner such that the color gradation of color out of the color reproduction range of the printer 105 is preserved.

The saturation mode is appropriate for use in the graphics portion of the image. The reproduction of a vivid color of the image is of concern. The image is mapped within the color reproduction range of the printer 105 in a manner such that the chroma component of color out of the color reproduction range of the printer 105 is preserved as much as possible.

The colorimetric agreement mode is appropriate in texts, such as characters and logos, which are reproduced with a particular color specified by a user on the application software 101. In this color matching method, the image is mapped to minimize a color difference (ΔE) so that a particular color is faithfully reproduced.

(4) Rasterizing Process

A rasterizing process generates RGB raster data compatible with the resolution of the printer 105 in response to the rendering command based on the color information that has been subjected to the color correction process and the color matching process. The image is successively rasterized in the RGB 24-bit page memory.

(5) Printer Color Process

A printer color process performs luminance-density conversion, masking, gamma process step, and N-value process step to the RGB raster data. The RGB raster data is thus converted into CMYK data compatible with marking material CMYK.

Figure 2:
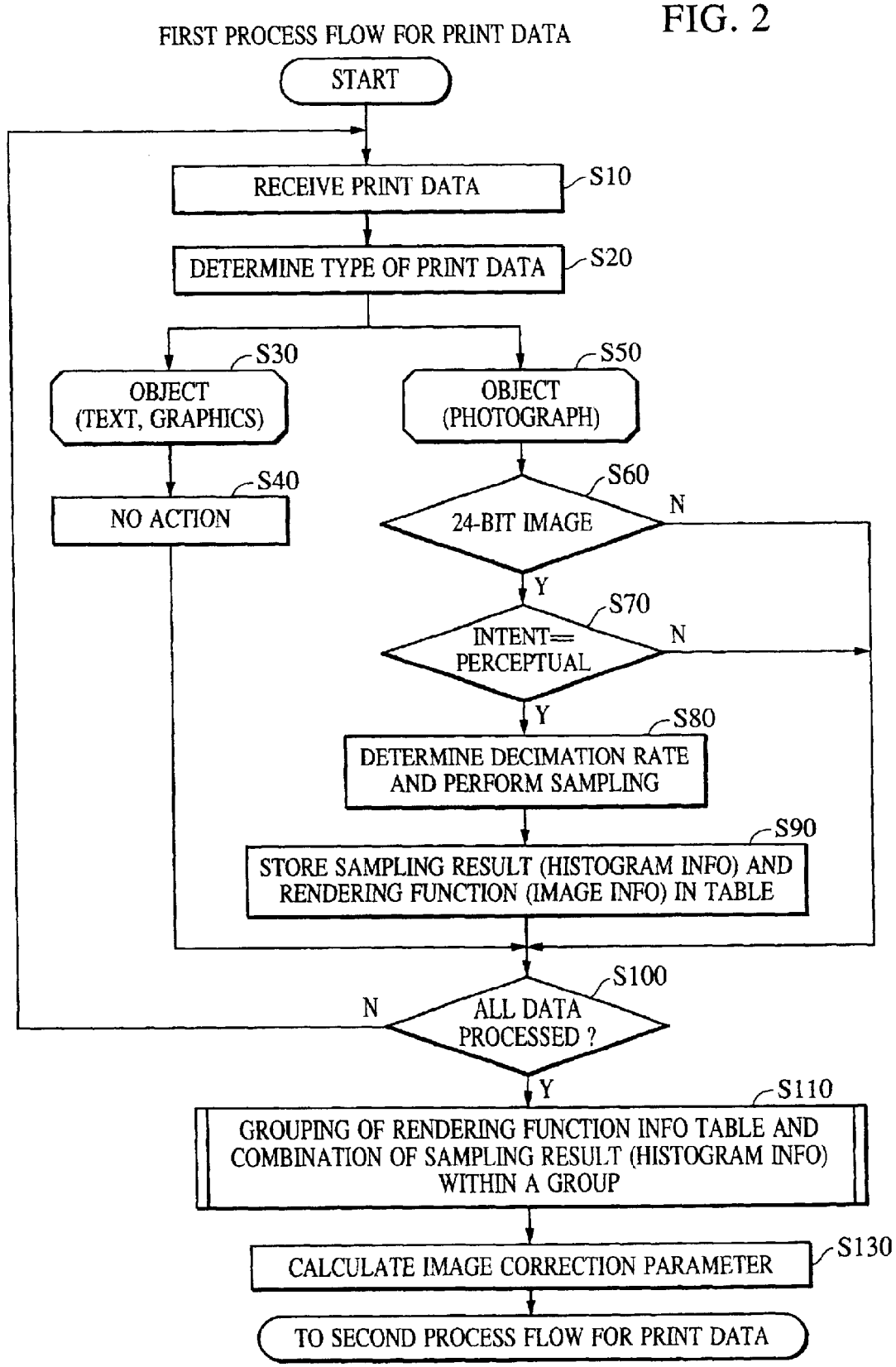
FIG. 2 is a flow diagram showing a first process flow of print data.
Figure 3:
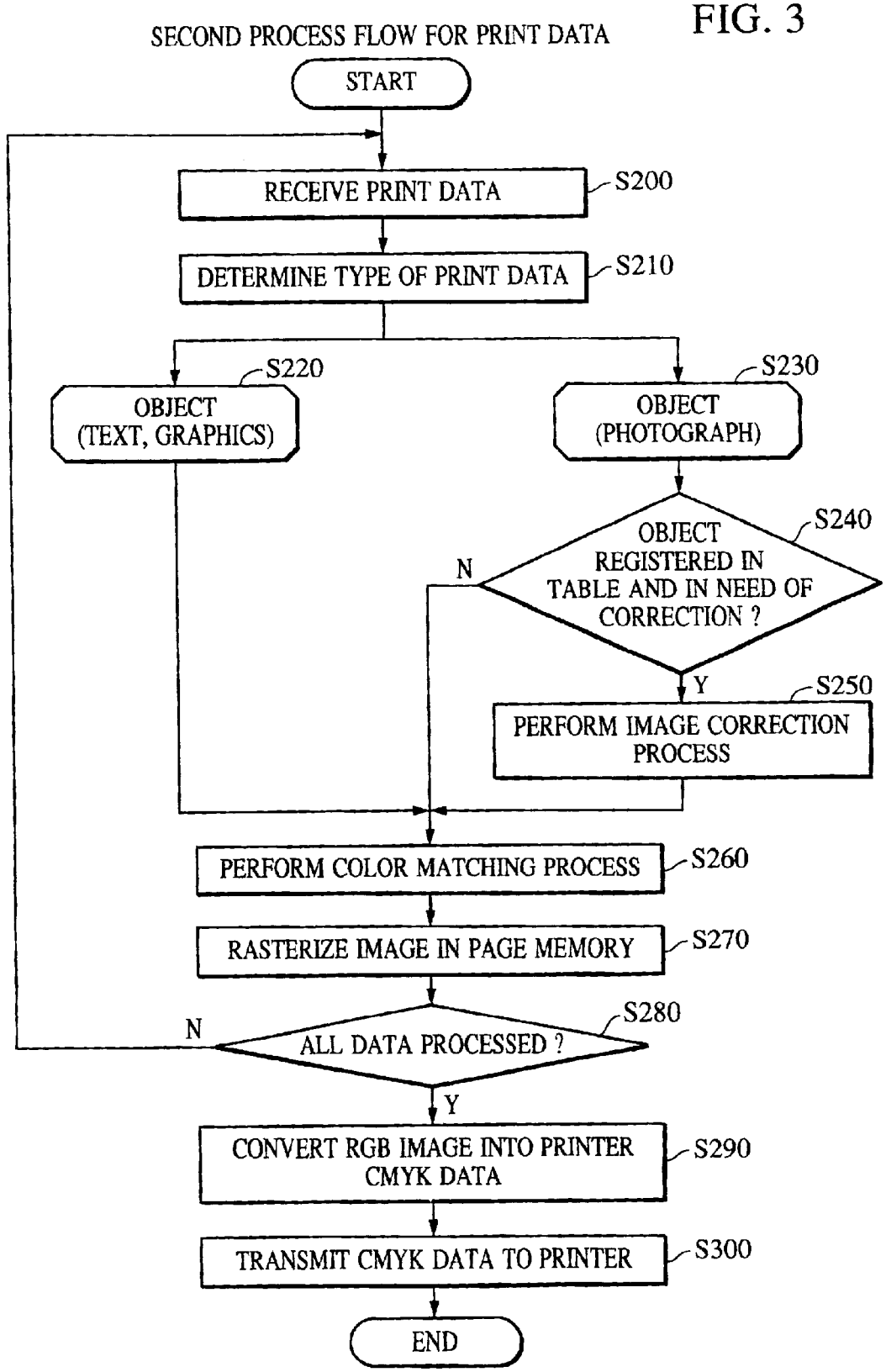
FIG. 3 is a flow diagram showing a second process flow of the print data.

The process flow of the printer driver 103 of the first embodiment is now discussed, referring to FIG. 2 and FIG. 3.

The printer driver 103 requests the print data (the rendering command group) forming a print page image to the application software 101 or the OS 102 twice. In response to each of the first request and the second request, the application software 101 issues all the rendering command group required to output the page.

FIG. 2 shows a first process flow of print data, and FIG. 3 shows a second process flow of the print data.

In the first process flow of the print data, the print data is analyzed, information required for the image correction process is collected, and a preparation of the image correction process is performed. In the second process flow of the print data, using the preparation result of the image correction process, the image correction process is performed on only a portion of the image rendering command which is determined to be in need of the image correction process. The color matching process is performed, the rendering command is rasterized in the page memory, and the print image is produced and transmitted to the printer 105.

The first process flow of the print data is now discussed, referring to FIG. 2.

In step S10, the rendering commands are received one by one from the application software 101 or the OS 102. In step S20, the content of the rendering command is analyzed, and the type of the object image indicated by the rendering command is recognized. When the rendering command indicates a text or graphics rather than a photograph, it is determined in step S20 that the object image is not a photograph. The process proceeds to step S30, then to step S40 where no action is performed in the first process flow, and then proceeds to step S100.

When it is determined in step S20 that the print data is photograph image data, the process proceeds to step S50. The image correction process used in the first embodiment corrects color balance distortion in a photograph caused by photographing conditions. The photograph image is typically a 24 bit RGB object image. In many cases, an image having a bit depth less than 24 bits (for example, an 8 bit pallet) is not a photograph in the original image thereof, and is therefore not intended as an object of correction. In step S60, the header of the function of the image rendering command is referenced. When the bit depth of the image is 24 bits or more, the process proceeds to step S70, else the process proceeds to step S100 as the image is not an intended object.

The header of the function of the image rendering command is referenced in step S70. When the intent of the header indicates the "perceptual color enhancement" mode that is suitable for a photograph, the process proceeds to step S80 as the image is an intended object. Even with the image having a bit depth of 24 bits, the image may be a corporate log when the intent of the header indicates the "colorimetric agreement" mode. The image may be a banner in a JPEG format in an Internet home page when the intent of the header indicates the "saturation" mode. In such a case, the image is treated as an unintended object, and the process proceeds to step S100.

The content of the object image transferred in response to the image rendering command is sampled in step S80. In a correction logic used in the first embodiment, it suffices to obtain an approximation of the luminance histogram of the object image, and it is not necessary to sample all pixels of an object image if the object image has a size greater than a predetermined value. Thus, the quality of the image is preserved even if the sampling is performed with the image decimated. In step S80, the decimation rate in the sampling operation is determined from the size of the object image and the decimation sampling is thus performed to increase process speed.

When the object image is as large as 100×100 pixels, the luminance histogram is created by sampling all pixels. When the object image is as large as 200×200 pixels, the sampling is performed at every two pixels at every two rows of pixels.

For example, let W represent the width of the object image, and H represent the height of the object image, and horizontal and vertical decimation rates Skipx and Skipy are determined as follows:

Skip$x$=($W$/100)+1

Skip$y$=($H$/100)+1

The determination of the decimation rates is not limited to this method. Any decimation rates appropriate for use in the correction logic may be employed.

When the referencing of the header of the function of the image rendering command in the creation of the luminance histogram shows that a source profile is designated (i.e., an ICC profile is added), the gamma value stored in the ICC profile is applied to the image in the sampling operation, and the luminance histogram is thus created.

The object image of the rendering command having a designated source file is subjected to color matching using the source profile responsive to the input color information included in the rendering command and the printer profile corresponding to the printer 105, as will be discussed later in conjunction with a color matching process in step S260 shown in FIG. 3. For example, dark image data, appearing underexposed, may be due to the inherent property of an input device which has produced that image. If the characteristics of the device as a source profile are added to the image, then, the characteristics of the device are compensated for by the source profile in the color matching. There are times when an image has been calibrated so that it is displayed on a very bright monitor 106. When a color space indicating a dark monitor character is designated in such a case, the device characteristics are reverted back to original ones in the color matching process. In the correction logic used in the first embodiment, if correction is performed on the image without regard to the correction carried out in the color matching, the image is further "brightened" in the color matching after the image has been "properly brightened" through the correction logic. As a result, double corrections are carried out, leading to an inadequate output image.

The correction amount of the characteristics inherent to the device is factored in the color matching process based in the source profile. In the correction logic of the first embodiment, correction is performed on the data of the image related to quantities other than the device characteristics, for example, on the quantities related to photographing conditions of the digital camera.

In the sampling operation, a histogram of the image data accounting for the gamma value of the source profile is created and process parameters are determined. In this way, the correction process, with the effect of the correction amount to be factored later in the color matching subtracted therefrom, is performed. Corrected in this way are a distorted color balance, contrast, and chroma. With the color matching process for correcting the device characteristics performed on the corrected image, proper image data is thus obtained.

In step S90, a single entry is formed in a table [ ] in the RAM as shown in FIG. 4. The sampling process result created in step S80 and rendering command information contained in the image rendering command are stored there.

Figure 5:
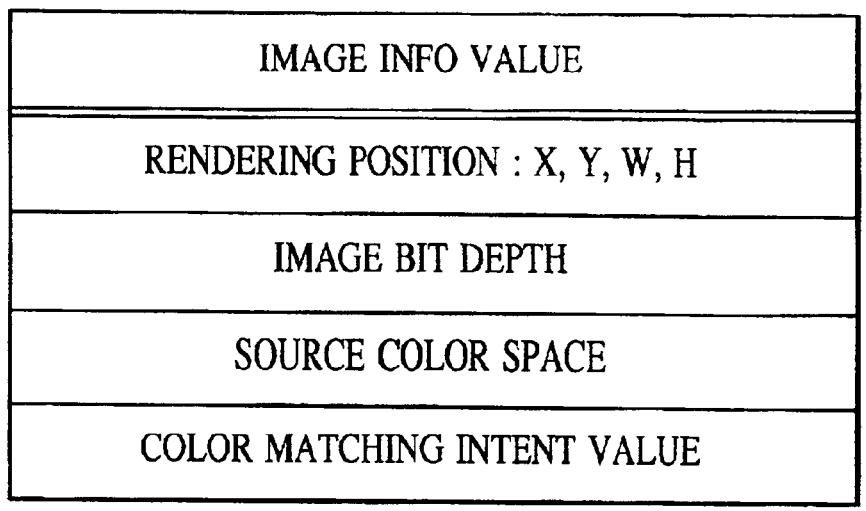
FIG. 5 shows the structure of an image information value.

FIG. 5 shows the content of the rendering command information Image Info stored in the table [ ].

The Image Info includes rendering positions X, and Y, width W, height H, the bit depth of the object image, source color space information designated by a CMS (Color Management System) and color matching intent value designated by the CMS.

Figure 6:
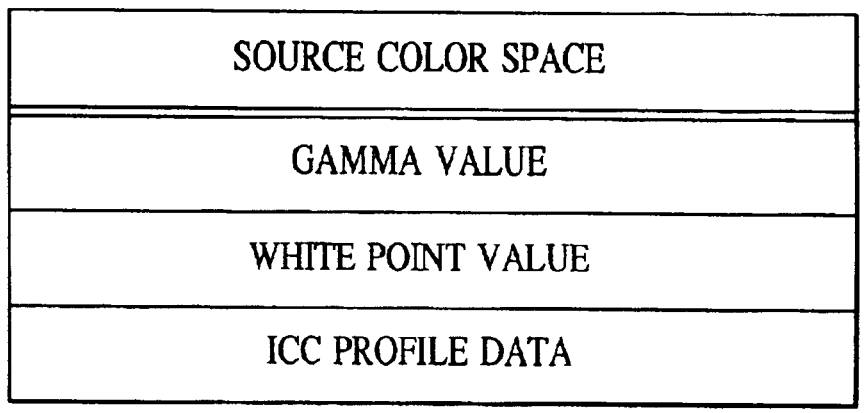
FIG. 6 shows the structure of a source color space.
Figure 7:
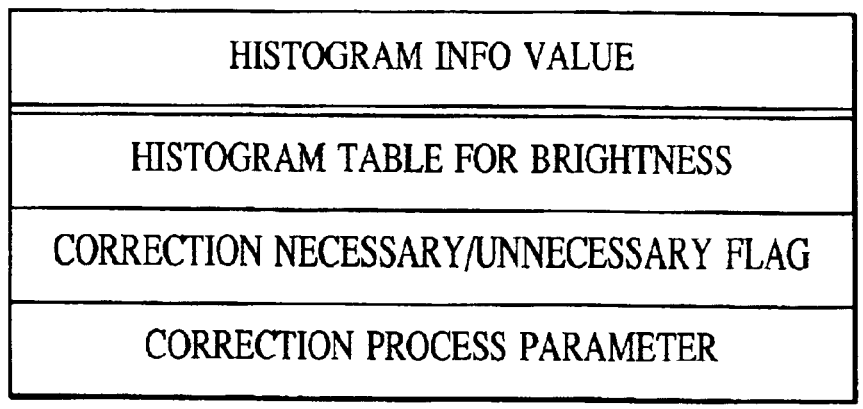
FIG. 7 shows the structure of a histogram information value.

FIG. 6 shows the source color space information contained in the Image Info.

The content of the source color space is an ICC profile storing the gamma value and the white point value presumed by the RGB 24 bit value of the object image, and a variety of information indicating characteristics represented by the RGB 24 bit value.

The process steps from step S10 through step S100 are repeatedly cycled through until the above process steps in response to all rendering commands have been completed in step S100. When all print data is processed, the process proceeds to step S110.

When the process reaches step S110, the table shown in FIG. 4 includes entries of a number equal to the number of image rendering commands indicating the object image as an intended object for image correction. Each entry contains the rendering command information Image Info of the object image and the sampling information Histogram Info of the object image. In step S110, the rendering command information Image Info of all entries in the table are mutually compared. A plurality of image rendering commands, into which a single image has been split by the application software 101, are grouped.

Figure 8:
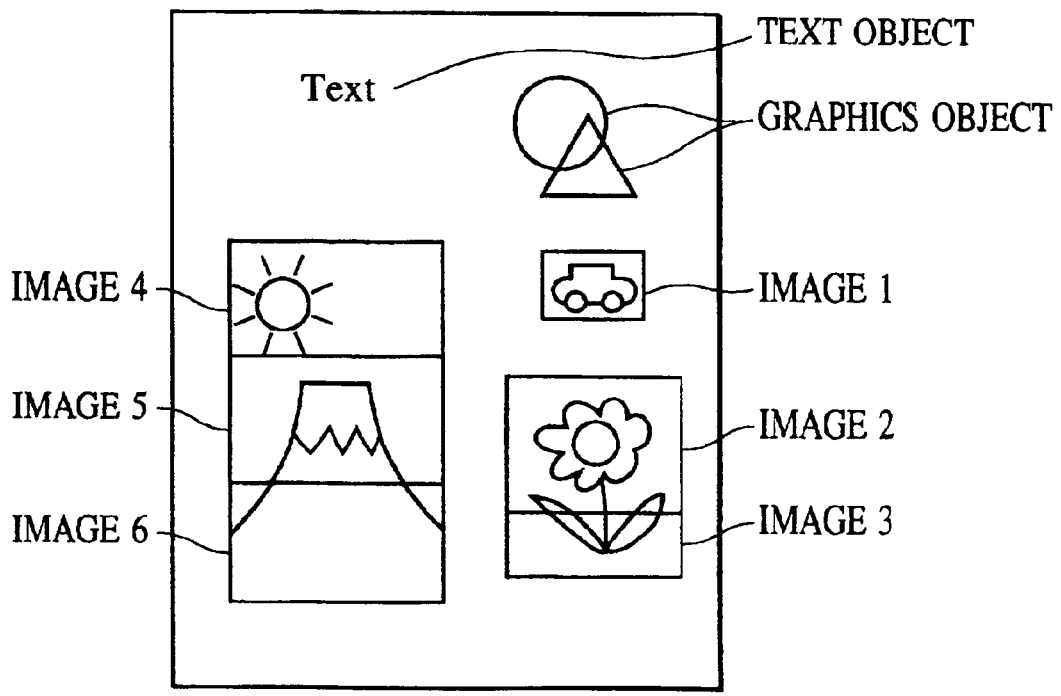
FIG. 8 shows one example of an input image.

FIG. 8 shows one example of document created by the application software 101. A single page is constructed of a single text object, two graphics objects, and six image objects.

The text object and the graphics objects are branched off to step S30 from step S20 as shown in FIG. 2, and no entries for these objects are formed in the table. Since an image 1 is an 8 bit pallet image, the determination in step S60 shown in FIG. 3 results in a negative answer, and no entry is thus formed in the table. Entries for five image rendering commands of images 2, 3, 4, 5, and 6 are formed in the table in step S80 as shown in FIG. 3.

In the page shown in FIG. 8, a total of five entries are formed when the process reaches step S110 in FIG. 2.

A user of the application software 101 pastes three images during document creation. The three images include a first one of the image 1, a second one which is internally split into the image 2 and the image 3 by the application software 101, and a third one which is internally split into the image 4, the image 5, and the image 6 by the application software 101.

Depending on application software, a single object image is frequently internally treated as a single object image, and is also output in a single image rendering command. In sophisticated application software for optimizing usage of memory and attaining a high operation speed, a large image, such as the one shown in FIG. 8, is internally split, and is processed using a plurality of image rendering commands. For example, PhotoShop by Adobe is known as this type of application software.

In the first embodiment, histograms are created independently of the image rendering command for image correction process. When the process for the page shown in FIG. 8 reaches step S110 in FIG. 2, different histograms are respectively formed for different parts into which an original single image is internally split by the application software 101.

For example, in the "background" of the photograph, the image 4 contains light sky in a large portion thereof, and the image 6 contains a "dark ground" in a larger portion thereof.

The correction parameters derived from the respective histograms become different.

When the correction parameter is derived from the respective histogram, different parameters are used for different parts in image correction. As a result, portions of the image, which originally should form the same object in the output image, suffer from a discontinuity in color tone at a border between parts of the image.

From the standpoint of the image quality of the output image, it is not appropriate to separately perform the correction process on the parts into which the application software 101 has internally split an originally single image.

To avoid this drawback, creating a histogram for the group is important based on the understanding that the image 4, the image 5, and the image 6 form an originally single image object, and are elements belonging to the same group. A plurality of histograms of the same group is synthesized, and the synthesized histogram for the entire group is thus obtained. A correction parameter effective for the entire group is thus calculated from the synthesized histogram. The image correction is thus performed on the entire group using the same single correction parameter.

A variety of methods are contemplated to group the entries stored in step S110 in the table.

A simple example is first discussed. Image Info of all entries in the table is cross-referenced to each other, and entries, which are determined to be close to each other from the rendering position information of X, Y, W, and H, are determined to belong to the same group.

In the image 4 and the image 5 as shown in FIG. 8, an X value and a Y value agree and Y+H of the image 4 and Y of the image 5 agree. The image 5 and the image 6 are thus determined to be vertically adjacent to each other. As a result, the image 4, the image 5, and the image 6 are determined to form a single image in the same single group.

FIG. 9 shows the content of the table having the determined group identification.

Indexes 0 and 1 respectively indicate entries of the image 2 and the image 3 in FIG. 8, and the image 2 and the image 3 are labeled the same identification ID=0. Indexes 2, 3, and 4 respectively indicate the image 4, the image 5, and the image 6 shown in FIG. 8. The image 4, the image 5, and the image 6 are labeled the same identification ID=1.

The table includes the five entries, but the determination divides these entries into two groups.

Besides the grouping process using the image location, grouping processes using more severe criteria are possible. For example, the bit depth of the Image Info may be added as a coincidence criterion condition, or a designated source color space is added as another coincidence criterion condition.

When the user of the application software 101 vertically adjacently arranges two same size object images one above the other, the grouping may be performed according to the rendering position information only, and the two different images may be grouped in the same group for histogram production. This results in an inappropriate correction parameter. If these two object images are obtained from different input devices, for example, one object image designates a source color space of a digital camera manufactured by a company A and the other object image designates a source color space of a digital camera manufactured by a company B. By determining the coincidence of the designated source color spaces, the two object images are found to be independent from each other.

Alternatively, the printer driver 103 may include, in a database, a list of names of application software 101 that performs image splitting, retrieves the name of the application software 101 that performs printing, and avoids grouping when an application not performing image splitting is included.

Alternatively, an interface may be provided, through which the user monitors a print image in a preview screen, visually checks the grouping result, and manually and positively indicates the group ID of each image when an erroneous recognition occurs therewithin. Application software "ColorAdvisor" manufactured by Canon Inc. is widely known for such a technique. Using the ColorAdvisor, the user modifies the color of a text portion referring to a preview of a print output to be fed to a commercially available Canon BJ Printer Driver.

Alternatively, a method is available to determine from the rendering position information of Image Info that images having overlapping portions therebetween fall within the same group. Split images sometimes overlap one above another rather than simply being adjacent to each other depending on application software.

The grouping method may be switched from one to another depending on the application software in use. Any method is acceptable as long as the entries of the split parts in the same group are labeled the same group ID.

Figure 10A:
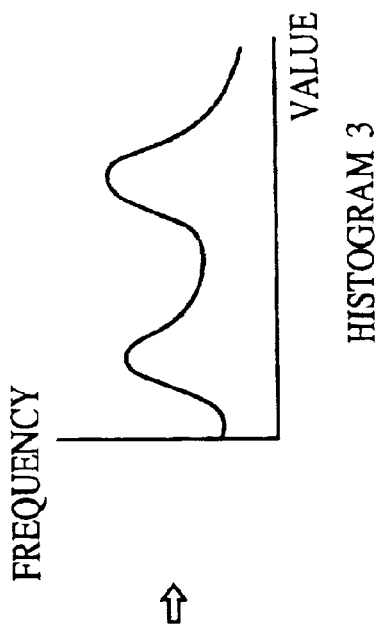
FIGS. 10A through 10C show a histogram synthesis process.
Figure 10B:
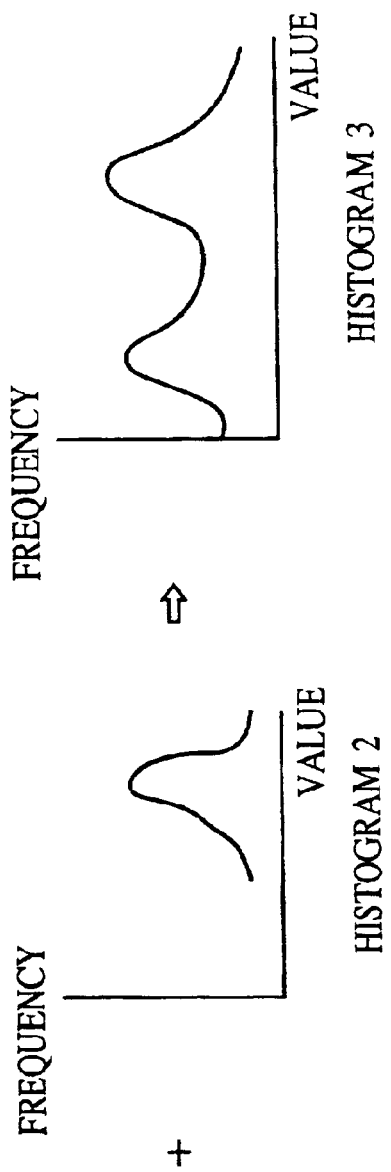
Figure 10C:
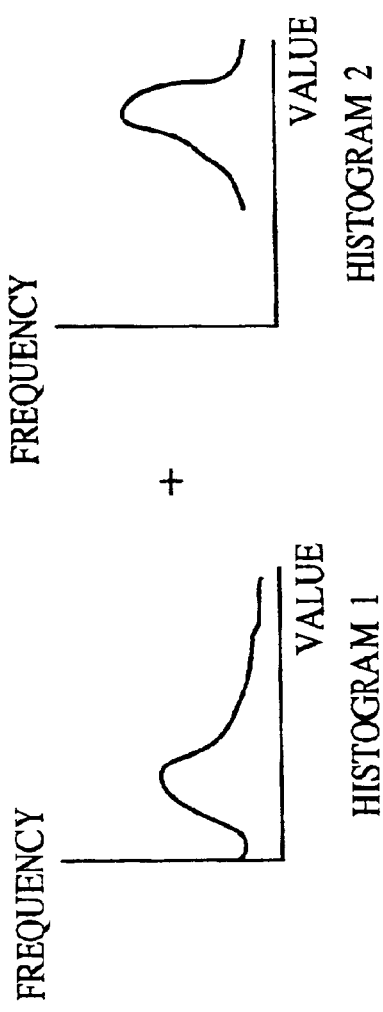

When the grouping process is complete with the group ID labeled as shown in FIG. 9 in step S110, sampling information Histogram Info having the same group ID is synthesized. In the synthesis of the sampling information, frequency information for the same luminance level is simply summed. For instance, when the index 1 entry and the index 2 entry, having the group ID=0, respectively have luminance histograms of Histogram 1 and Histogram 2 as shown in FIG. 10A and FIG. 10B, the two histograms are synthesized, thereby forming Histogram 0 (Histogram Info 0) as shown in FIG. 10C.

As a result, the indexes 0 and 1 in the table are synthesized, thereby having the same sampling information Histogram Info 0 (see FIG. 9).

Similarly, the indexes 2, 3, and 4 are synthesized, thereby having the same sampling information Histogram Info 1 (see FIG. 9).

In step S130, the correction parameter to be used in the above-described image correction process is calculated from the luminance histogram of the grouped images, and the calculation result is stored in the Histogram Info of the entries of the table.

The first process flow of the print data illustrated in FIG. 3 is now complete, and the printer driver 103 requests the OS 102 or the application software 101 to send the print data for the second time.

The second process flow of the print data is now discussed, referring to FIG. 3.

In the same way as in the first process flow of the print data in step S200, the print data (rendering commands) is received one by one from the application software 101 or the OS 102. In step S210, the content of the rendering command is analyzed. When the rendering command is a text or graphics, rather than a photograph image, the process goes to step S220 and then to S260. In step S260, the color matching process is performed in accordance with the type of the object. In step S270, the object is rasterized in the page memory.

When it is determined in step S210 that the object is a photograph image, the process proceeds to step S230.

In step S240, whether the photograph image rendering command is a table entry object is determined by comparing the rendering position, the bit depth of the object image, the color space information, and the intent value of the image rendering command with the information of the Image Info entered in the table for matching. When there is no matched entry, the process goes to step S260 for color matching, and the object is rasterized in the page memory in step S270.

When it is determined in step S240 that there is a matched entry in the table, the process goes to step S250. In step S250, the image correction process is performed on the object image of the image rendering command, using the correction parameter stored in the Histogram Info of the table entry having fully matched Image Info.

In step S260, the color matching process of the perceptual color enhancement mode appropriate for photographs is performed on the object image that has been corrected in step S250. In step S270, the object image is rasterized in the page memory.

It is determined in step S280 whether all print data is processed. Process steps S200–S280 are repeatedly cycled through until all print data on a page has been processed.

When it is determined in step S280 that all print data has been processed, the process proceeds to step S290. The printer color process is performed on the print image data created in the page memory. The print image is thus converted into an image which is printable on the printer 105.

In step S300, the print image is assembled into print data printable on the printer 105 and is then transferred to the printer 105. In a typical raster printer, data compression is performed line by line, and is assembled into a simple printer command pack for transmission.

Second Embodiment

In the first embodiment, the color matching process for printing is performed as one color process of the printer driver 103. In a second embodiment, the application software 101 for color editing performs a color matching process on the input image using the color matching module 111.

The fact that the color matching process has been performed on the input image through the application software 101 means that the user has already performed color correction on the image using the application software 101. Performing the image correction process and the color matching process in the printer 105 possibly destroys the color setting already corrected by the user and is thus inappropriate.

In the second embodiment, when the header of the function of the rendering command indicating the object image input by the printer driver 103 includes information indicating that the color matching process has already been performed, the image correction process and the color matching process already discussed in conjunction with the first embodiment are not performed on the object image.

In accordance with the second embodiment, the color process of the printer driver 103 is controlled taking into account the color process already performed by the application software 101, and a high-quality image thus results.

Modifications

In the preceding embodiments, the print request is issued to the application software 101 twice. Alternatively, the rendering command input in response to the first print request may be stored without the need for issuing the second print request.

The image correction process is performed by the printer driver 103 in the preceding embodiments. Alternatively, the image correction process may be performed by the monitor driver 104. Furthermore, the image correction process may be performed by color modification application software.

The preceding embodiments use a raster driver as the printer driver 103. The present invention is applicable to a printer driver of page description language, such as a PostScript.

In the preceding embodiments, the histogram of value is created. Alternatively, histograms may be created based on other components indicating brightness, such as luminance.

In the above discussion, the profile is added to the header of the rendering function in the color matching process. In this case, it suffices to store, in the header of the rendering function, information which is referred to for reading the profile stored in the memory.

An arrangement may be incorporated so that whether to perform the image correction process may be manually instructed on the user interface of the printer driver 103.

The present invention may be applied to a system of a plurality of apparatuses such as a host computer, interface devices, a reader and a printer) or to individual apparatuses (such as a copying apparatus or a facsimile receiver).

Program codes of the software program for performing the functions of the preceding embodiments are fed to an a computer in an apparatus or a system, each connected to a variety of devices, so that the devices operate to carry out the functions of the above-referenced functions. The computer (CPU or MPU) in the apparatus or the system is operated under the control of the stored software program, thereby controlling the diversity of devices. Such a system falls within the scope of the present invention.

The program codes of the software program perform the functions of the above-referenced embodiments. The program codes and means for supplying the program codes to the computer, such as a storage medium storing the program codes, fall within the scope of the present invention.

Available as storage media for feeding the program code are a floppy disk, a hard disk, an optical disk, a magnetooptical disk, a CD-ROM, a magnetic tape, a non-volatile memory card, a ROM, and the like.

The computer executes the supplied software program, thereby performing the functions of the embodiments. Furthermore, the program codes perform the functions of the embodiments in cooperation with the OS (Operating System) running on the computer or in cooperation with another software program. Such program codes fall within the scope of the present invention.

The supplied program codes are written on a function expansion board inserted into the computer or a memory provided on a function expansion unit connected to the computer. A CPU on the expansion board or function expansion unit partly or entirely performs the process. The functions of the embodiments are thus performed. Such a system also falls within the scope of the present invention.

Although the present invention has been described with respect to the preferred embodiments, the invention is not limited to the foregoing embodiments but many modifications and variations are possible within the spirit and scope of the appended claims of the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-processing method for performing color matching using a source profile and an output profile, said method comprising the steps of:

determining the type of input image, based on a rendering command indicating the input image;

correcting input image data in accordance with the source profile when it is determined in said determining step that the input image is a photograph image;

calculating a feature quantity of the input image based on the corrected input image data;

performing an image correction process on the corrected input image data in accordance with a processing condition responsive to the feature quantity; and performing a color matching process on the input image data when it is determined in said determining step that the input image is not a photograph image, and on the corrected input image data subjected to the image correction process when it is determined in said determining step that the input image is a photograph image.

2. An image-processing method according to claim 1, wherein the correction of the input image data in accordance with the source profile is based on a gamma value described in the source profile.

3. An image-processing method according to claim 1, wherein the correction of the input image data in accordance with the source profile is based on a white point described in the source profile.

4. An image-processing method according to claim 1, wherein the color matching process is performed according to the type of the input image.

5. An image-processing method for performing color matching using a source profile and an output profile, said method comprising the steps of:

determining the type of input image based on a rendering command indicating the input image;

correcting input image data in accordance with the source profile when it is determined in said determining step that the input image is a photograph image;

calculating a feature quantity of the input image based on the corrected input image data;

performing an image correction process on the corrected input image data in accordance with a processing condition responsive to the feature quantity; and performing a color matching process on the input image data when it is determined in said determining step that the input image is not a photograph image, and on the corrected input image data subjected to the image correction process when it is determined in said determining step that the input image is a photograph image, wherein said calculation step includes a substep of creating a histogram based on the corrected input image data, and a substep of calculating a high-light point and a shadow point.

6. An image-processing device for performing color matching using a source profile and an output profile, said device comprising:

determination means for determining the type of input image, based on a rendering command indicating the input image;

correction means for correcting input image data in accordance with the source profile when it is determined by said determination means that the input image data is a photograph image;

calculation means for calculating a feature quantity of the input image based on the corrected input image data;

image correction processor means for performing an image correction process on the corrected input image data in accordance with a processing condition responsive to the feature quantity; and color matching processor means for performing a color matching process on the input image data when it is determined by said determination means that the input image is not a photograph image, and on the corrected input image data subjected to the image correction process when it is determined by said determination means that the input image is a photograph image.

7. A storage medium for storing a computer-readable software program of an image-processing method for performing color matching using a source profile and an output profile, the software program comprising:

code for a determining step, of determining the type of input image, based on a rendering command indicating the input image;

code for a correction step, of correcting input image data in accordance with the source profile when it is determined by said code for a determining step that the input image is a photograph image;

code for a calculation step, of calculating a feature quantity of the input image based on the input image data;

code for an image correction step, of performing an image correction process on the corrected input image data in accordance with a processing condition responsive to the feature quantity; and code for a color matching step, of performing a color matching process on the input image data when it is determined by said code for determining step that the input image is not a photograph image, and on the corrected input image data subjected to the image correction process when it is determined by said code for a determining step that the input image is a photograph image.

8. An image-processing apparatus for performing color matching using a source profile and an output profile, said apparatus comprising:

a determination unit adapted to determine the type of input image, based on a rendering command indicating the input image;

a correction unit adapted to correct input image data in accordance with the source profile when it is determined by said determination unit that the input image is a photograph image;

a calculation unit adapted to calculate a feature quantity of the input image based on the corrected input image data;

an image correction processor unit adapted to process an image correction process on the corrected input image data in accordance with a processing condition responsive to the feature quantity; and a color matching processor adapted to perform a color matching process on the input image data when it is determined by said determination unit that the input image is not a photograph image, and on the corrected input image data subjected to the image correction process when it is determined by said determination unit that the input image is a photograph image, wherein said calculation unit includes a histogram creation unit adapted to create a histogram based on the corrected input image data, and another calculation unit adapted to calculate a high-light point and a shadow point.

9. A storage medium for storing a computer-readable software program of an image-processing method for performing color matching using a source profile and an output profile, the software program comprising:

code for a determining step, of determining the type of input image, based on a rendering command indicating the input image;

code for a correction step, of correcting input image data in accordance with the source profile when it is determined by said code for a determining step that the input image is a photograph image;

code for a calculation step, of calculating a feature quantity of the input image based on the input image data;

code for an image correction step, of performing an image correction process on the corrected input image data in accordance with a processing condition responsive to the feature quantity; and code for a color matching step, of performing a color matching process on the input image data when it is determined by said code for determining step that the input image is not a photograph image, and on the corrected input image data subjected to the image correction process when it is determined by said code for a determining step that the input image is a photograph image, wherein said code for a calculation step includes code for a substep of creating a histogram based on the corrected input image data, and code for a substep of calculating a high-light point and a shadow point.

* * * * *

UNITED STATES PATENT AND TRADEMARK OFFICE
CERTIFICATE OF CORRECTION

PATENT NO. : 6,954,288 B2
DATED : October 11, 2005
INVENTOR(S) : Akihiko Uekusa et al.

It is certified that error appears in the above-identified patent and that said Letters Patent is hereby corrected as shown below:

Column 1,
Line 47, "has" should read -- have --.

Column 2,
Line 55, "high light" should read -- high-light --.

Column 3,
Line 4, "soft ware," should read -- software, --.

Column 5,
Line 52, "Chroma=C12+C22" should read -- $Chroma = \sqrt{C_1^2 + C_2^2}$ --.

Column 6,
Line 28, "with" should read -- within --.

Column 7,
Line 41, "else" should read -- otherwise --.

Column 13,
Line 12, "such" should read -- (such --; and
Line 16, "an a" should read -- a --.

Column 15,
Line 26, "determining" should read -- a determining --.

Column 16,
Line 35, "determining" should read -- a determining --.

Signed and Sealed this

Sixteenth Day of May, 2006

JON W. DUDAS
*Director of the United States Patent and Trademark Office*